(12) United States Patent
Ho (10) Patent No.: US 10,348,241 B1
(45) Date of Patent: Jul. 9, 2019

(54) SOLAR RECEIVERS AND METHODS FOR CAPTURING SOLAR ENERGY

(71) Applicant: National Technology & Engineering Solutions of Sandia, LLC, Albuquerque, NM (US)

(72) Inventor: Clifford K. Ho, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/071,781

(22) Filed: Mar. 16, 2016

Related U.S. Application Data (60) Provisional application No. 62/135,547, filed on Mar. 19, 2015.

(51) Int. Cl.
| | |
|---|---|
| *H02N 6/00* | (2006.01) |
| *H01L 31/042* | (2014.01) |
| *H02S 40/44* | (2014.01) |
| *F24S 70/10* | (2018.01) |
| *F24S 25/00* | (2018.01) |

(52) U.S. Cl.
CPC .............. *H02S 40/44* (2014.12); *F24S 25/00* (2018.05); *F24S 70/10* (2018.05)

(58) Field of Classification Search
CPC ............ H02S 40/44; F24S 25/00; F24S 70/10
USPC ........................................................ 136/246
See application file for complete search history.

(56) References Cited

U.S. PATENT DOCUMENTS

| | | | | |
|---|---|---|---|---|
| 2010/0126554 | A1* | 5/2010 | Morgan ................. | H02S 20/00 136/246 |
| 2011/0209849 | A1* | 9/2011 | Reichert ................. | F24D 3/18 165/47 |
| 2012/0097216 | A1* | 4/2012 | Lin ........................ | F24J 2/06 136/248 |
| 2014/0366929 | A1* | 12/2014 | Blau ...................... | H02S 20/32 136/246 |

* cited by examiner

*Primary Examiner* — Angelo Trivisonno
(74) *Attorney, Agent, or Firm* — Daniel J. Jenkins (57) ABSTRACT

Thermal receivers, systems, and methods are disclosed that efficiently capture concentrated solar energy into a plurality of heat absorption bodies for conversion into thermal energy. In an embodiment, the thermal receivers, systems, and methods enable simultaneous electricity conversion and thermal energy capture. The receiver design enables a high penetration of concentrated sunlight deep into the thermal receiver to increase light trapping and reduce thermal losses. The thermal receiver is integrated with a photovoltaic (PV) receiver platform that converts some of the incident light to electricity while passing the remaining light to the thermal receiver. In another embodiment, other thermal receivers, systems, and methods are disclosed that efficiently capture concentrated solar energy into a sheet of falling particles. In an embodiment, the thermal receivers, systems, and methods enable simultaneous electricity conversion and thermal energy capture.

6 Claims, 5 Drawing Sheets

SOLAR RECEIVERS AND METHODS FOR CAPTURING SOLAR ENERGY

CROSS-REFERENCE TO RELATED APPLICATIONS

This application claims priority to provisional patent application U.S. Ser. No. 62/135,547, entitled "SOLAR RECEIVERS AND METHODS FOR CAPTURING SOLAR ENERGY," by Clifford K. Ho, filed Mar. 19, 2015, the disclosure of which is incorporated herein by reference in its entirety.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

FIELD

The present disclosure is generally directed to solar energy. The present disclosure is more particularly directed to solar thermal systems that integrate a photovoltaic system with a thermal receiver.

BACKGROUND

Solar power systems offer much promise for clean energy, with few, or zero, carbon emissions. These systems collect incident sunlight and convert this sunlight into a usable form of power, such as heat or electricity. Solar energy offers a clean, inexhaustible, sustainable solution to energy demands and has the potential to supply a very significant fraction of U.S. and global electricity consumption. While the U.S. and global solar power potential is known to be immense, solar power systems have not been economically competitive without government support, to date. Challenges remain to devise solar technologies that can lower installation costs, increase power output, and lower the marginal cost per unit energy produced, for a lower levelized cost of energy. An important metric is the overall system efficiency, that is, the electric power output per incident solar power collected.

Solar power systems include photovoltaic (PV) systems, solar thermal systems, and others. PV systems utilize photovoltaic solar cells that convert sunlight directly into electricity by the photovoltaic effect. These solar cells are expensive, and their efficiencies are limited because they can exploit only a portion of the solar spectrum. These systems are also characterized by a large energy-payback period, i.e., the time they must be exposed to sunlight and produce electricity, to return the energy required to produce and install them.

Solar thermal systems convert sunlight into heat and either use this heat directly or convert the heat to generate electricity. Examples of solar thermal systems include solar power towers, parabolic trough systems, and dish-Stirling systems. Solar power towers utilize a large number of steerable, planar, or near-planar mirrors that reflect and direct rays of sunlight to a central tower where a heat-transfer fluid is heated. The heat collected is typically transferred to rotating machinery, such as a steam turbine, that is used to drive an electric generator. These systems suffer from low efficiencies because of high optical losses, such as cosine and other optical losses, solar-receiver losses, as well as temperature and power losses from long fluid-flow loops to and from the tower. Cosine losses refer to the energy lost when light rays from the sun do not strike the mirror perpendicular to its surface. To reflect rays of sunlight to the central tower, individual mirrors form an acute angle to the sun, therefore requiring more mirror surface than when the mirror is perpendicular to the sun's rays. Collection efficiency is increased and mirror cost is less when the mirror is perpendicular to the sun.

Volumetric solar receivers have been developed and implemented in concentrating solar power towers. The objective is to irradiate a honeycomb or waffle pattern of channels while pulling air through the channels to heat the air. The air is then used to heat a storage material or to generate steam for electricity production. Current designs of the channels do not allow for deep penetration of the irradiance, and the receiver surfaces get hot near the aperture, maximizing radiative heat loss. None of the previous volumetric receiver designs integrates PV.

Solar receivers have also been used to heat particles, both inert and thermochemically reactive particles for additional energy storage. Although no commercial solid particle receivers exist, a significant amount of research has been performed to develop efficient solid particle receivers for energy storage and electricity production. None of these previous concepts has included the use of a light-transmitting PV array at the aperture to generate electricity while mitigating convective and radiative heat losses.

The need remains, therefore, for a solar thermal system that efficiently converts sunlight into heat. The need also remains for solar power systems that combine the efficiencies of solar thermal systems and PV systems. The need also remains for solar power systems that combine the efficiencies of thermochemical particle systems and PV systems.

SUMMARY OF THE DISCLOSURE

In an embodiment of the disclosure, a solar receiver is disclosed that includes a thermal receiver and a photovoltaic receiver attached to the thermal receiver. The thermal receiver includes a housing having an opening for receiving concentrated solar energy and a plurality of heat absorbing bodies defining a passageway. The passageway includes an opening and an exit opening. The photovoltaic receiver includes openings for allowing air to pass through the photovoltaic receiver to the opening of the passageway of the thermal receiver. The photovoltaic receiver is configured to allow concentrated solar light passing through the photovoltaic receiver to illuminate the plurality of heat absorbing bodies In another embodiment of the disclosure, a method of capturing concentrated solar energy is disclosed that includes illuminating a photovoltaic receiver with concentrated solar energy, capturing a portion of the concentrated solar energy with the photovoltaic receiver to generate electricity, absorbing a portion of the concentrated solar energy passing through the photovoltaic receiver into a plurality of heat absorbing bodies, and heating air passing over the plurality of heat absorbing bodies.

In another embodiment of the disclosure, a thermal receiver system is disclosed that includes a housing having an opening for receiving concentrated solar energy, and a plurality of heat absorbing bodies defining a passageway within the housing. The passageway comprising an opening for receiving air and an exit opening for discharging heated air. Concentrated solar energy received in the opening of the housing is directed into the opening of the passageway.

In another embodiment of the disclosure, a method of capturing solar energy is disclosed that includes passing concentrated solar energy through a window, absorbing a portion of the concentrated solar energy passing through the photovoltaic receiver into a plurality of heat absorbing bodies, and heating air by contacting the air with the plurality of heat absorbing bodies.

In another embodiment of the disclosure, a solar receiver is disclosed that includes a falling particle receiver and a photovoltaic receiver attached to the falling particle receiver. The photovoltaic receiver captures a portion of the solar spectrum for conversion to electricity while being transmissive to another portion of the solar spectrum that is absorbed by particles falling through the falling particle receiver.

In another embodiment of the disclosure, a method for capturing solar energy is disclosed that includes illuminating a photovoltaic receiver with concentrated solar energy, capturing a portion of the concentrated solar energy with the photovoltaic receiver to generate electricity, and absorbing a portion of the concentrated solar energy passing through the photovoltaic receiver into a plurality falling particles passing through a thermal receiver.

In another embodiment of the disclosure, a thermal receiver system is disclosed that includes a falling particle thermal receiver comprising an opening for receiving concentrated solar energy, and one or more heliostats for directing concentrated solar energy into the opening. The falling particle thermal receiver is configured to flow particles in a sheet having a thickness of between having a thickness between 0.5 cm and 5 cm.

In another embodiment of the disclosure, a method of capturing solar energy is disclosed that includes directing concentrated solar energy into an opening of a falling particle solar receiver, and heating a falling sheet of particles with the concentrated solar energy passing though the opening.

In another embodiment of the disclosure, a solar receiver is disclosed that includes a thermal receiver and a PV receiver attached to the thermal receiver. The PV receiver includes openings for allowing light to pass through the PV receiver to the thermal receiver, and the PV receiver is cooled by air flowing to the thermal receiver.

In an embodiment of the disclosure, a solar receiver is disclosed that includes a falling particle receiver and a PV receiver attached to the falling particle receiver. Light passing through the PV receiver heats particles passing through the falling particle receiver.

In an embodiment of the disclosure, a solar collection system is disclosed that includes a concentrating solar collection system and a solar receiver for receiving concentrated solar energy from the concentrating solar collection system. The solar receiver includes a thermal receiver and a PV receiver attached to the thermal receiver. The PV receiver includes openings for allowing light to pass through the PV receiver to the thermal receiver, and the PV receiver is cooled by air flowing to the thermal receiver.

In an embodiment of the disclosure, a solar collection system is disclosed that includes a concentrating solar collection system and a solar receiver for receiving concentrated solar energy from the concentrating solar collection system. The solar receiver includes a falling particle receiver and a PV receiver attached to the falling particle receiver. Light passing through the PV receiver heats particles passing through the falling particle receiver.

In an embodiment of the disclosure, a method for capturing solar energy is disclosed that includes capturing a portion of the solar energy by a PV array, and allowing another portion of the solar energy to pass through the PV array to be captured by a solar thermal receiver.

In an embodiment of the disclosure, a method for capturing solar energy is disclosed that includes capturing a portion of the solar energy by a PV array, and allowing another portion of the solar energy to pass through the PV array to heat particles.

An advantage of the present disclosure is to provide a solar power system that combines solar thermal and PV systems.

Another advantage of the present disclosure is that the integration of a volumetric air receiver and a PV system enables cooling of the PV system for higher efficiency operation and preheating of the air before it enters the volumetric receiver. Another advantage of the present disclosure is the radial design of the volumetric receiver surfaces that allows a greater penetration of the solar irradiance, reducing the radiative heat loss near the aperture.

An advantage of integrating a PV array at the aperture (and along the spillage boards surrounding the aperture) of a falling particle receiver system is that electricity and thermal energy can be simultaneously generated. The PV array can have holes or slots to enable a small amount of ambient air flow into and out of the receiver to keep the PV array cooler for improved efficiency. The PV array will also minimize convective and radiative heat losses from within the cavity receiver.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present disclosure is directed to a thermal receiver that includes a plurality of thermal panels for capturing solar energy from concentrated sunlight and transferring the captured energy to air. A light focusing device focuses and concentrates light on the thermal receiver to capture heat. Air is pulled through the thermal receiver and heat is transferred from the thermal receiver to the air to generate heated air. The heated air can be used for other applications, such as, but not limited to in a heat exchanger for thermal storage (e.g., in solid media, particles, or molten salt) or electricity generation (e.g., generate steam for Rankine power cycle).

In an embodiment, the light focusing device may be a mirror or array of mirrors. In an embodiment, the thermal or solar receiver is disposed on top of a tower surrounded by a field of heliostats. In another embodiment, the light focusing device may include a dish collector system, where the thermal or solar receiver are attached to a truss and located near the focal point of the dish. In an embodiment, the dish collector tracks the sun during normal operation.

In an embodiment the thermal receiver may include a PV array to generate electricity. The PV array is disposed in the light focusing device. The PV array includes gaps or opening so that light can transmit through to the thermal receiver (the cells themselves can also be transmissive at particular wavelengths) to generate heat. The air pulled through the thermal receiver also serves to cool the PV array so that it can operate more efficiently at lower temperatures.

The present disclosure is also directed to methods for capturing solar energy that includes capturing solar thermal energy and transferring that energy to air. In an embodiment, the method also includes the generation of electrical energy.

The present disclosure is further directed to solar receivers and methods for capturing solar energy using a solar receiver having a veil, curtain or sheet of falling particles that absorb the solar energy.

Figure 1:
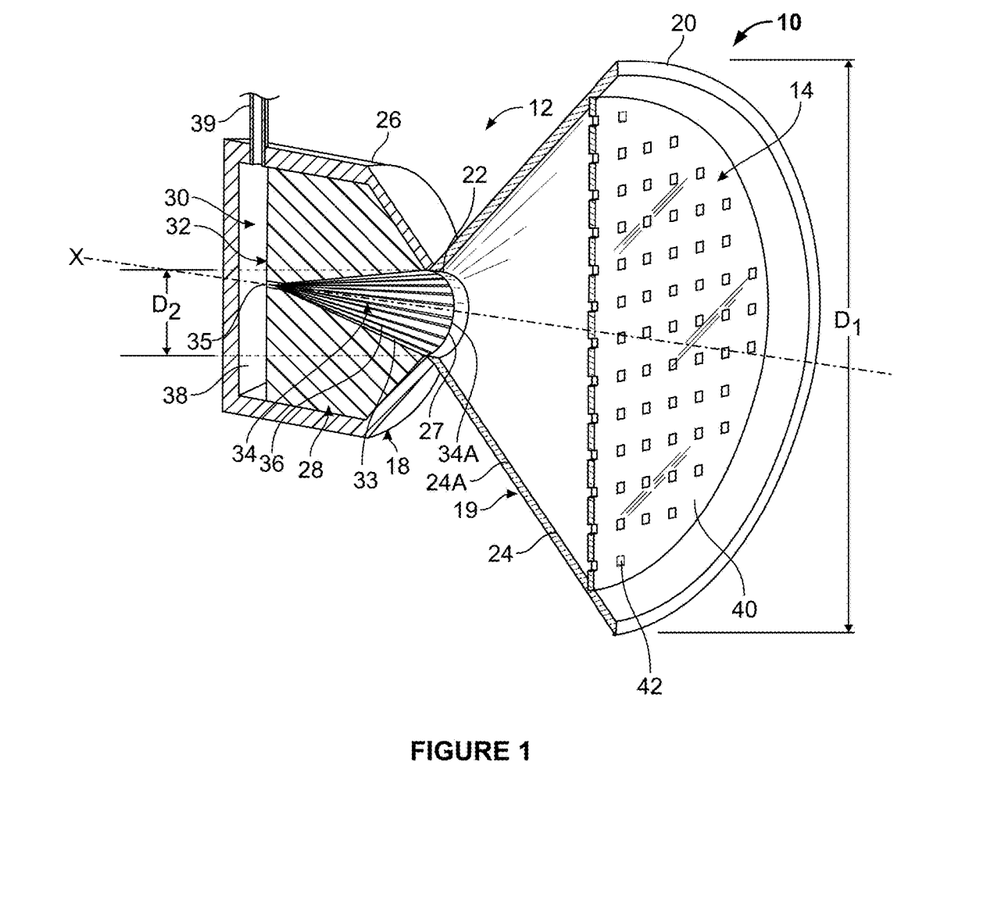
FIG. 1 is an illustration of a cut away view of a thermal receiver according to an embodiment of the disclosure.

FIG. 1 shows a cross-section of an embodiment of thermal receiver 10 according to an embodiment of the disclosure. The thermal receiver 10 includes a heat exchange unit 18 and a solar collector unit 19. The solar collector unit 19, which may be referred to as a secondary concentrator, includes a housing 24 having a conical geometry having a first end 20 having a first diameter D1 that tapers to a second end 22 having a second diameter D2, where D1>D2. The housing 24 includes an inner surface 24A that directs or channels concentrated sunlight towards the second end 22. The inner surface 24A that may be any reflective surface to direct the light toward the aperture of the thermal receiver. In such a manner, the shape of the solar receiver 10 exploits the converging/diverging rays from a dish collector or other solar concentrator. The inner surface 24A is cooled by the incoming air flow. In this exemplary embodiment, the solar collector unit 19 has a conical geometry, however, in other embodiments, the solar collector unit 19 may have a conical, parabolic, or other geometry that focuses and/or concentrates solar energy into the opening 27.

In another embodiment, the solar collector unit 19 may be omitted. In an embodiment where the solar collector unit 19 is omitted, a high temperature window (not shown) may be placed over the opening 27. The high temperature window is formed of a high temperature, solar spectrum transmissive material, such as, but not limited to quartz.

In this exemplary embodiment, the solar collector unit 19 includes an optional PV panel or receiver 14. The PV receiver 14 includes a PV cell or array 40 disposed upon the PV receiver 14. In this exemplary embodiment, the PV array 40 covers the surface of the PV receiver 14. In other embodiments, the PV receiver may include one or more PV arrays 40 that may cover all or a portion of the surface of the PV receiver or be otherwise integrated into the PV receiver 14. In other embodiments, the PV receiver 14 may be omitted. The PV receiver 14 is a transmissive, semiconductor structure that allows thermal spectrum to pass through while capturing other portions of the solar spectrum for conversion to electricity. In an embodiment, the percentage of light that passes through the PV receiver 14 to the thermal receiver can vary between 10%-90% depending on the need and value for thermal storage. In this exemplary embodiment, the PV receiver 14 is shown conforming to the housing 24. In other embodiments, the PV receiver 14 may be separated from or partially separated the housing 24 to allow air to pass between the PV receiver 14 and the housing 24.

The PV receiver 14 includes a plurality of openings 42 that allow for concentrated light and pass through and be absorbed the heat exchange unit 18 thereby heating the thermal receiver 12. Note that this light is in addition to the light passing through the PV receiver 14. The openings 42 also allows for air to pass through and cool the PV receiver 14, increasing the efficiency thereof. In this exemplary embodiment, the openings are square, however, in other embodiments, the openings 42 may be, but are not limited to circular, oval, square, and rectangular shapes.

The PV receiver 14 includes electrical leads, conductors, connections and other elements (not shown) that collect electrical energy from the PV receiver 14. These components are not shown for simplicity however, the structure and function thereof are well understood in the art. In another embodiment, the PV receiver 14 may have fins or other heat exchange members extending from the rear side of the PV array 40 to improve cooling of the PV array.

In other embodiments, the solar collector unit 19 may include a high temperature window similar in shape and in place of the PV receiver 14. The high temperature window may be made of a high temperature, solar transmissive material, such as, but not limited to quartz. When the thermal receiver 10 includes the PV receiver 14, the thermal receiver 10 may be referred to as a solar receiver. The combination of the thermal receiver 10 and PV receiver 14 allows the solar receiver to utilize the full spectrum of solar irradiance to generate electricity and heat.

The heat exchange unit 18 includes a housing 26. The housing 26 includes an opening 27 that corresponds to the second end 22 of the solar collector unit 19. The opening 27 is positioned so as to also be or is proximate to the focal plane for concentrated sunlight that has been focused upon the thermal receiver 10.

The heat exchange unit 18 further includes a heat absorbing unit 28 and heat transfer zone 30 disposed within the housing 26. The heat absorbing unit 28 includes a plurality of radially extending heat absorbing bodies or fins 32 disposed around passageway 34. The fins 32 have inner or passageway surfaces 33 that define passageway 34. The fins 32 also define radial spaces 36 between adjacent fins 32. The passageway 34 and the radial spaces 36 enable air to flow between the opening 27 and the collection space 38 while in contact with the fins 3, enabling heat to be transferred to the air from the fins. Heat is also transferred to the air from the fins 32 while the air is in the collection space 38.

The fins 32 are formed of a high temperature material such as metal, ceramic and cermet. In an embodiment, the fins 32 may be formed of a metal, such as, but not limited to stainless steel, Inconel 625, or Haynes 230 The fins 32 may have surfaces or coatings on the fin surfaces 33 and/or surfaces facing adjoining fins that have features or perforation to enhance the penetration and/or trapping of light and to enhance the heat transfer to the flow air. The fins 32 are oriented to allow deep penetration of the light rays for volumetric heat absorption while minimizing re-radiation (thermal emittance) out of opening 27, and in particular back to the PV receiver 14.

Figure 1A:
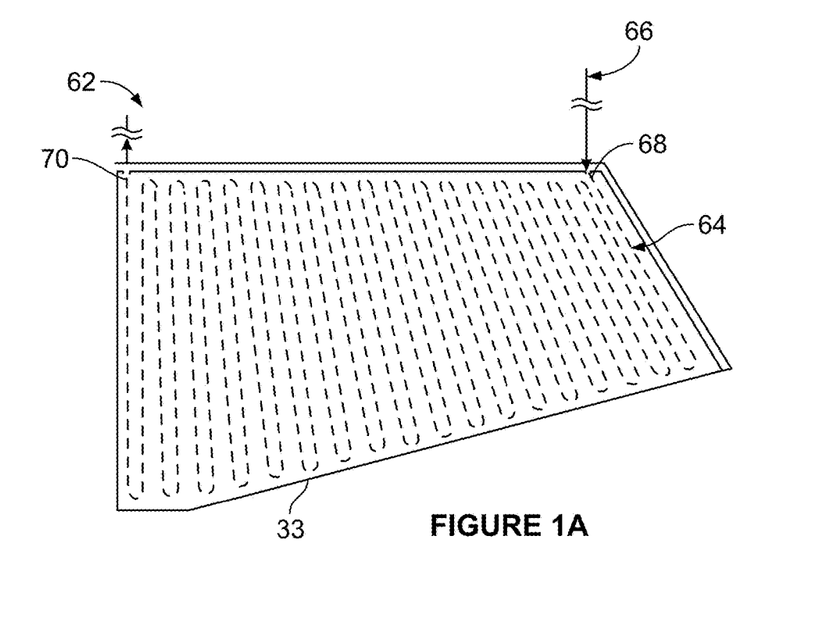
FIG. 1A is an illustration of a fin according to an embodiment of the disclosure.

FIG. 1A illustrates an embodiment of a fin 62 according to an embodiment of the disclosure. In this exemplary embodiment, the fin 62 includes an internal channel or micro-channel 64 in fluid connectivity with a secondary fluid system 66 for the heating of a secondary fluid, such as, but not limited to gases, liquids, and supercritical fluids. The micro-channel 64 has an input 68 and output 70 for receiving and outputting a fluid from the micro-channel 64. In other embodiments, the fin 62 may have one or more channels or micro-channels. In this exemplary embodiment, the input 68 is shown providing fluid to a portion of the fin 62 closest to the opening 27. For example, the secondary fluid may be a gas such as, but not limited to helium: a liquid such as, but not limited to water, liquid metals, molten salts, hydrocarbons; and supercritical fluids such as, but not limited to supercritical $CO_2$. In another embodiment, the fin 62 may include one or more cavities for containing a secondary fluid.

The heat transfer zone 30 includes open space or airways in contact with the fins 32 and includes passageway 34, radial spaces 36 between the fins 32, and a collection space 38. In this exemplary embodiment, the passageway 34 has a conical geometry. In another embodiment, the passageway 34 may have other geometries, such as, but not limited to cylindrical or tubular with a circular, square, hexagonal or other cross-section. The passageway 34 includes opening 34a that is fluidly connected to opening 27. In this exemplary embodiment, the opening 34a smoothly transitions to opening 27 of housing 26 so as to allow light entering opening 27 to be unobstructed in penetrating into passageway 34. The passageway also includes exit opening 35. The passageway 34 is defined by fin surfaces 33 of fins 32. The conical geometry of the passageway 34 provides a light-trapping geometry with low radiative view factors and thermal emittance back to the collector support panel 14 and to the environment.

As discussed above, the passageway 34 receives air from the opening 27 and allows for that air to either flow into the radial spaces 36 between the fins 32 or to flow though the passageway 34 and into the collection space 38 via an exit opening 35. The radial spaces 36 are also open to the collection space 38 so as to allow the air flowing in the radial spaces 36 to flow into the collection space 38. The air flowing through the passageway 34 and is heated by the fin surfaces 33. The passageway 34 allows for focused sunlight passing through the opening 27 to be absorbed by the fin surfaces 33 as the sunlight diverges and travels down the conical passageway 34.

Also as discussed above, the collection space 38 is a volume that receives air from the passageway 34 and radial spaces 36. The collection space 38 is fluidly connected to an outlet 39 that allows air to exit the collection space 38. In such a manner, air is drawn into the opening 27, heated by fins 32 that have been heated by concentrated sunlight, collected in the collection space 38 and provided to another system via the outlet 39 that utilizes the heated air for a secondary purpose. In another embodiment, a fan or other air moving device or system may be connected to the outlet 39 to assist the flow of air through the thermal receiver 10. The heated air may be used in a secondary system, such as, but not limited to systems to heat thermochemically reactive particles, drive power generation equipment, heat secondary fluids, heat particles from a falling particle receiver, or heat any other working fluid for thermal or electrical power generation.

In an embodiment, the thermal receiver 10 can translate along the axis of the collector focal length X to allow variable power to reach the thermal receiver 12 and PV receiver 14. This may be important when the direct normal irradiance (DNI) is changing and/or when more or less thermal capture and/or storage is desired relative to PV power generation. For example, during off-peak, low-load times, it may be more desirable to generate thermal energy for storage rather than electricity. Then, the PV receiver 12 would be moved further away from the thermal receiver 12 (and focal plane) so that more of the concentrated solar flux can reach the thermal receiver 10. In an embodiment, the thermal receiver 10 is a component of a solar collection system that includes a mirror or array of mirrors to focus and concentrate sunlight onto the receiver.

Figure 1B:
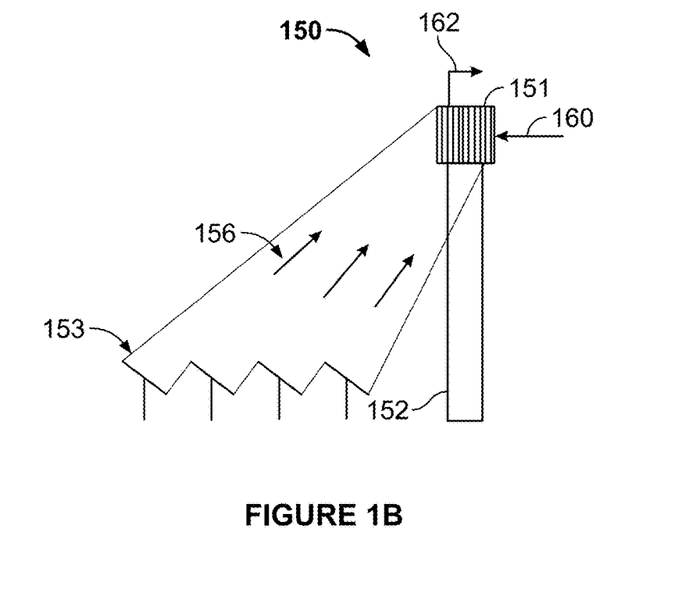
FIG. 1B is an illustration of a thermal receiver system according to an embodiment of the disclosure.

FIG. 1B illustrates a thermal receiver system (system) 150 according to an embodiment of the disclosure. As can be seen in FIG. 1A, the system 150 includes a thermal receiver 151 mounted atop a tower 152. The thermal receiver 151 receives ambient air 160 and produces heated air 162. The system also includes heliostats 153 that direct concentrated solar light 156 at the thermal receiver 151. In this exemplary embodiment, four heliostats are shown, however, in other embodiments, the system 150 may include one or more heliostats. The thermal receiver 151 may be the receiver shown in FIG. 1 and described above. Other embodiments may include the thermal receiver shown in FIG. 2 and described below.

Figure 2:
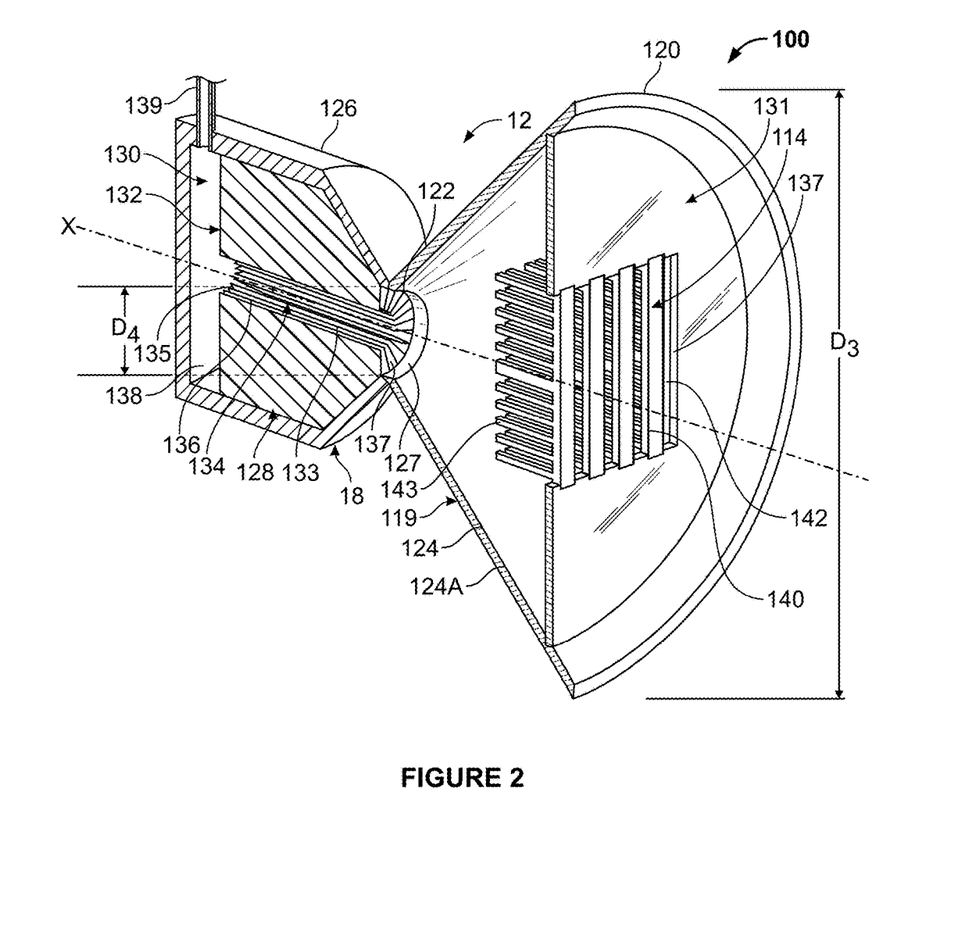
FIG. 2 is an illustration of a cut away view of another embodiment of a thermal receiver according to an embodiment of the disclosure.

FIG. 2 illustrates an embodiment of a solar receiver 100 according to the present disclosure. The solar receiver 100 includes a thermal receiver 112 and a PV receiver 114. The thermal receiver 112 includes a heat exchange unit 118 and a solar collector unit 119. The solar collector unit 119, which may be referred to as a secondary concentrator, has a housing 124 having a conical geometry having a first end 120 having a first diameter D3 that tappers to a second end 122 having a second diameter D4, where D3>D4. The housing 124 includes an inner surface 124A that directs or channels concentrated sunlight towards the second end 122. The inner surface 124A may be any reflective surface to direct the light toward the aperture of the thermal receiver. The inner surface 124A will be cooled by the incoming air flow. In another embodiment, the solar collector unit 119 may have a conical, parabolic, or other geometry that focuses and/or concentrates solar energy into the opening 127.

In another embodiment, the solar collector unit 119 may be omitted. In an embodiment where the solar collector unit 119 is omitted, a high temperature window (not shown) may be placed over the opening 127. The high temperature window is formed of a high temperature, solar spectrum transmissive material, such as, but not limited to quartz.

The heat exchange unit 118 includes a housing 126. The housing 126 includes an opening 127 that corresponds to the second end 122 of the solar collector unit 119. The opening 127 is positioned so as to also be or is proximate to the focal plane for concentrated sunlight that has been focused upon the solar receiver 100.

The heat exchange unit 118 further includes a heat absorbing unit 128 and heat transfer zone 130 disposed within the housing 124. The heat transfer zone 130 includes open space or airways in contact with the fins 132 and includes a passageway 134, radial spaces 136 and a collection space 138. In this exemplary embodiment, the passageway 134 has a cylindrical geometry. In another embodiment, the passageway 34 may have another geometry, such as, but not limited to conical. In this exemplary embodiment, the passageway 134 has a circular cross-section, however, in other embodiments the cross-section may be, but is not limited to circular, square, and hexagonal. The passageway 134 is fluidly connected to opening 127 and includes exit opening 135. The passageway 134 is defined by fin surfaces 133 of fins 132. The cylindrical geometry of the passageway 134 provides a light-trapping geometry with low radiative view factors and thermal emittance back to the PV receiver 114 and to the environment.

The passageway 134 receives air from the opening 127 and allows for that air to either flow into the radial spaces 136 between the fins 132 or to flow though the passageway 134 and into the collection space 138 via an exit opening 135. The radial spaces 136 are also open (not shown) to the collection space 138 so as to allow the air flowing in the radial spaces 136 to flow into the collection space 138. The air flowing through the passageway 134 is heated by the fin surfaces 133. The passageway 34 allows for focused sunlight passing through the opening 127 to be absorbed by the fin surfaces 133 as the sunlight diverges and travels down the conical passageway 134.

The heat absorbing unit 128 includes a plurality of radially extending bodies or fins 132 disposed around passageway 134. As discussed above, the fins 132 have fin surfaces 133 and radial spaces 136 between adjoining fins that allow for the passage of air from the passageway 134 to the collection space 138. The fins 132 are formed of a high temperature material such as metal, ceramic and cermet. In an embodiment, the fins 132 may be formed of a metal, such as, but not limited to stainless steel, Inconel 625, or Haynes 230. The fins 132 may have surfaces or coatings on the fin surfaces 133 and/or surfaces facing adjoining fins that have features or perforation to enhance the penetration and/or trapping of light and to enhance the heat transfer of the flow air. The fins 132 are oriented to allow deep penetration of the light rays for volumetric heat absorption while minimizing re-radiation (thermal emittance) out of opening 127, and in particular back to the PV receiver 114. In this exemplary embodiment the fins 132 include a leading edge 137. In an embodiment, the leading edge may be light absorbing and/or include a light absorbing coating. In another embodiment, the leading edge may be omitted and the surface 133 may taper to the opening 127. In such a manner, the shape of the heat absorbing units exploits the converging/diverging rays from a dish collector or other solar concentrator.

As discussed above, the collection space 138 is a volume that receives air from the passageway 134 and radial spaces 136. The collection space 138 is fluidly connected to an outlet 139 that allows air to exit the collection space 138. In such a manner, air is drawn into the opening 127, heated by fins 132 that have been heated by concentrated sunlight, collected in the collection space 138 and provided to another system via the outlet 139 that utilizes the heated air for a secondary purpose.

In another embodiment, the fins 132 may include channels or micro-channels in fluid connectivity with secondary systems for the heating of a secondary fluid, such as, but not limited to gases, liquids, and supercritical fluids. For example, the secondary fluid may be a gas such as, but not limited to helium; a liquid such as, but not limited to water, liquid metals, molten salts, hydrocarbons; and supercritical fluids such as, but not limited to supercritical $CO_2$.

As discussed above, the solar collector unit 119 concentrates sunlight into the opening 127. In this exemplary embodiment, the solar collection unit includes an end substrate or cap 131 supported by the housing 124. The end cap 131 has a central opening 137. In an embodiment, all or part of the end cap 131 may be translucent or allow for the transmittance of light. In an embodiment, the end cap 131 may have one or more PV arrays integrated with or attached to the end cap 131. In another embodiment, the end cap 131 may have one or more openings. The PV receiver 114 is supported by the end cap 131 in the central opening.

The PV receiver 114 includes a PV cell or array 140 disposed upon the surface of the PV receiver 114. In other embodiments, the PV receiver 114 may include one or more PV arrays 140 that may cover all or a portion of the surface of the PV receiver 114. Electrical connections to and from the PV receiver 114 are not shown for clarity, however, the structure and function thereof are well understood in the art. The PV receiver 114 allows for at least a portion of light incident to the PV array to pass through the PV receiver 114 and thus be collected and used for thermal heating in the thermal receiver 112. In an embodiment, the percentage of light that passes through the PV array to the thermal receiver can vary between 10%-90% depending on the need and value for thermal storage.

The PV receiver 114 includes openings 142. The openings 142 allow for concentrated light and air to pass through the PV array 140 and be collected and used for thermal heating in the thermal receiver 112. In this exemplary embodiment, the openings 142 are slots and have a rectangular cross-section, however, in another embodiment, the openings 42 may be of any suitable geometry, such as, but not limited to circular, square, oval, and rectangular. The air passing through the openings 142 of the PV receiver 112 cool the PV array, increasing efficiency thereof. In this exemplary embodiment, the PV receiver 114 includes heat transfer members 143 that extend from the PV receiver towards the opening 127 that cool the PV receiver 114 by transferring heat from the PV receiver 114 to air passing through the solar collection unit 19 to the thermal receiver 112.

In an embodiment, the thermal receiver 112 and PV receiver 114 can translate along the axis of the collector focal length X to allow variable power to reach the thermal receiver 112 and PV receiver 114. This may be important when the direct normal irradiance (DNI) is changing and/or when more or less thermal capture and/or storage is desired relative to PV power generation. For example, during off-peak, low-load times, it may be more desirable to generate thermal energy for storage rather than electricity. Then, the PV receiver 112 would be moved further away from the thermal receiver 112 (and focal plane) so that more of the concentrated solar flux can reach the thermal receiver 112.

Figure 3:
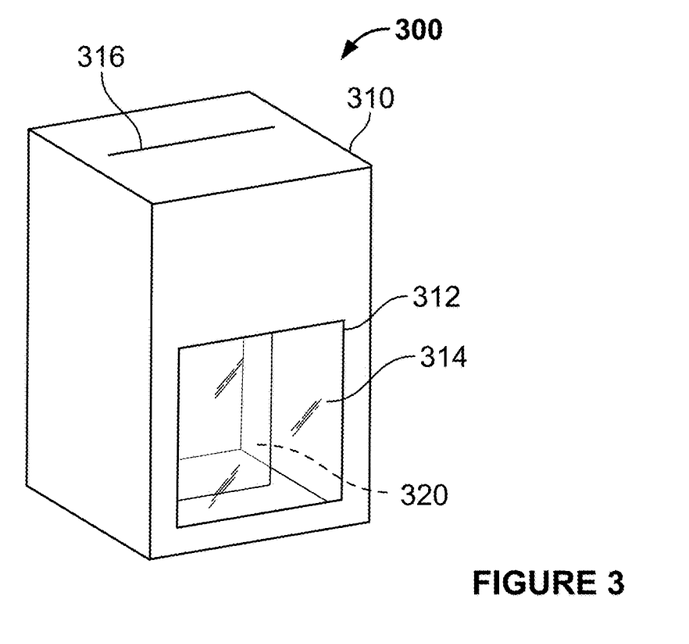
FIG. 3 is an illustration of a falling particle receiver according to an embodiment of the disclosure.
Figure 4:
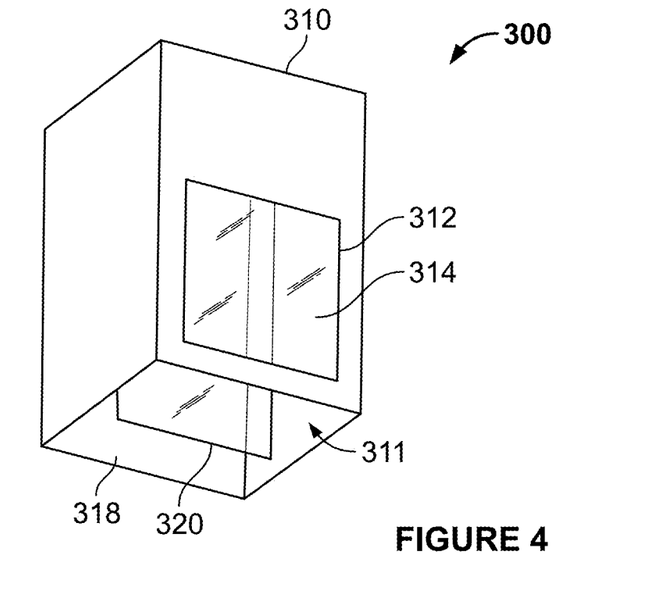
FIG. 4 is another view of the falling particle receiver of FIG. 3.

FIGS. 3 and 4 illustrate an embodiment of a solar receiver 300 according to another embodiment of the disclosure. The solar receiver 300 includes a housing 310 having a window 312. The housing 310 surrounds a an interior space or cavity 311. The window 312 allows for concentrated sunlight to enter the cavity 311. In this exemplary embodiment, the window 312 includes a PV cell or array 314 disposed upon the surface thereof. In another embodiment, the window 312 may include one or more PV cells and/or arrays. The PV array 314 is a transmissive, semiconductor structure that allows thermal spectrum to pass through while capturing other portions of the solar spectrum for conversion to electricity. In an embodiment, the percentage of light passing through the PV array 314 can vary between 10%-90% depending on the need and value of the remaining light spectrum passing through the PV array 314.

Figure 3A:
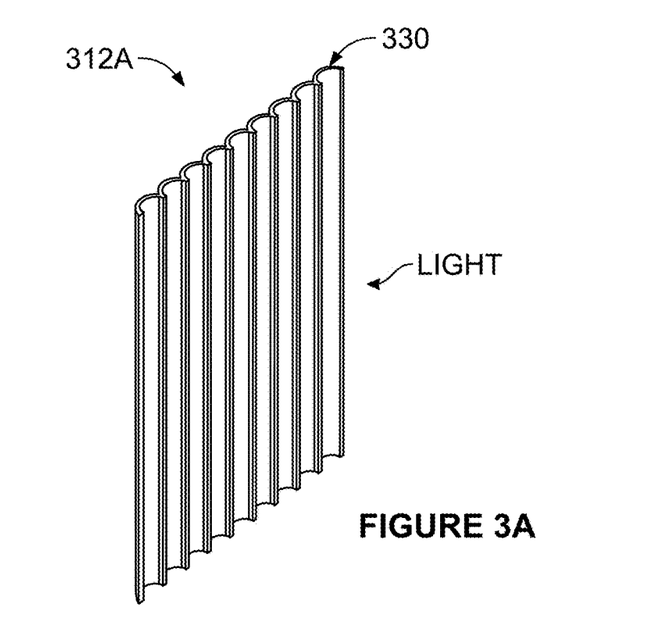
FIG. 3A is an illustration of a high temperature window according to an embodiment of the disclosure.

In another embodiment the window 312 may not include a PV array 314, and may be formed of a high temperature, solar spectrum transmissive material, such as, but not limited to quartz. In this exemplary embodiment, the window 312 may have a flat front facing surface as shown in FIGS. 3 and 4. In another embodiment, the front facing surface of the window 312 may be not be flat, but may be undulating, wavy or of other light trapping or guiding geometries, which may reduce the reflective losses relative to a flat window. For example, FIG. 3A illustrates an embodiment of a window 312A having an undulating front facing surface that includes a plurality of parallel open concave channels. In an embodiment, the open concave channels have a channel width of between about 2 cm and 50 cm. In this exemplary embodiment, the window 312A is formed of a plurality of half-cylinders of quartz tubes 330 having the concave side facing the incoming solar radiation. In an embodiment, the quartz tubes may have a diameter of between about 2 cm and 50 cm. In another embodiment, the quartz tubes may have a diameter of between about 5 cm and 50 cm. In yet another embodiment, the quartz tubes may have a diameter of between about 5 cm and 20 cm. In other embodiments, the undulating window 312A may be formed of a single cast quartz panel or from other joined structures that create a light trapping or guiding surface. In other embodiments, the window 312 may be omitted and an opening remaining in its place. In this exemplary embodiment, the window 312 is solid. In other embodiments, the window 312 and/or PV array 314 may include holes, slots, gaps or other openings for allowing air and light to pass through and cool the window 312 an/or the PV array 314. In another embodiment, the window 312 may be deleted and replaced with an open space.

As can further be seen in FIGS. 3 and 4, the solar receiver (receiver) 300 further includes an opening 316 for receiving a plurality of particles or particle steam into a particle heating zone 318 within the housing 310. In this exemplary embodiment, the opening 316 is a rectangular opening or slot that allows for the particles to fall through the receiver in a thin veil, sheet or curtain of particles 320. The thickness of the particle sheet or curtain 320 can range from about 0.5 cm to about 20 cm, depending on the desired mass flow rate and opacity of the particle curtain, which impact particle temperature rise and thermal efficiency. In another embodiment, the thickness of the particle sheet or curtain 320 may range from about 0.5 cm to about 5 cm The solar receiver 300 further includes a particle collector and exit (not shown) where the particles are collected and exit from the particle heating zone 318.

The particles may be, but are not limited to silica sands, ceramic particles, sintered bauxite, pervoskites, and thermochemically reactive particles (e.g., particles that can undergo a reduction/oxidation reaction for increased heat capacitance and heating of the working fluid.

Solar spectrum (light) passing through the window 312, PV array 314 and openings (when present) are used to illuminate and heat falling particles 320. A benefit of this design is that the window 312 and PV array 314 serve to mitigate convective and radiative heat loss from within the cavity 311. Also, the air movement within the cavity 311 from the falling particles and air passing through the PV array 314 can serve to cool the PV array. The ambient air that enters the cavity 311 may also leave the cavity 311 through the openings in the PV array or become entrained with the particles. In other embodiments, air may also be deliberately blown along the window or PV array to cool the window or PV array.

Particles heated in the portion of the cavity 311 that the particles pass through or particle heating zone 318 may be used for thermochemical processes. For example, the particles may be reduced and absorb extra energy beyond the sensible heating energy required to raise the temperature of the particle. The particles could then be later oxidized by an air stream to recoup the sensible and thermochemically stored energy.

Figure 5:
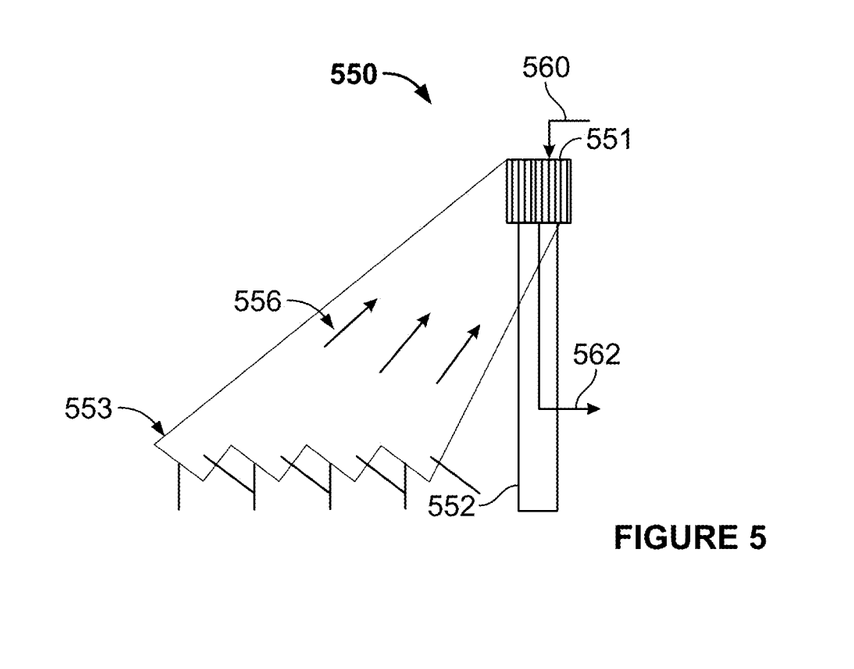
FIG. 5 is an illustration of another thermal receiver system according to another embodiment of the disclosure.

FIG. 5 is an illustration of another thermal receiver system (system) 550 system according to another embodiment of the disclosure. As can be seen in FIG. 5, the system 550 includes a thermal receiver 551 mounted atop a tower 552. The thermal receiver 551 is as described above in discussing FIGS. 3 and 4. The thermal receiver 551 receives a particulate material via particulate material input stream 560, and discharges heated particles via particulate material output stream 562. The system 550 also includes heliostats 553 that direct concentrated solar light 556 at the thermal receiver 551. In this exemplary embodiment, four heliostats are shown, however, in other embodiments, the system 550 may include one or more heliostats.

In other embodiments, concentrated sunlight may be directed and focused upon the solar receiver 300 by known solar concentrator systems and methods, such as, but not limited to the use of heliostats, parabolic mirrors, or other reflecting elements. The focal plane is located at the aperture or opening of the receiver (not shown, but as shown and described regarding FIGS. 3 and 4) into the cavity or particle heating portion of the solar receiver 300. The incident light converges to this plane and then diverges within the cavity.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A solar receiver, comprising:
   a thermal receiver comprising:
   a solar collector unit comprising a housing comprising a first end having a first opening for receiving concentrated solar energy and a second end having a second opening for allowing the concentrated solar energy to pass through the housing, the solar collector unit having a conical geometry tapered from the second end to the first end, the first opening having a first diameter larger than a second diameter of the second opening of the second end;
   a plurality of heat absorbing bodies that receive sunlight from the solar energy passing through the housing, the plurality of heat absorbing bodies defining a passageway having an axis along the axis of the focal length, the passageway comprising an opening connected to the second opening of the housing, the passageway further comprising an exit opening; and a photovoltaic receiver attached to the housing of the thermal receiver proximate the first end;

wherein the photovoltaic receiver includes openings passing through the photovoltaic receiver for allowing air to pass through the photovoltaic receiver to the opening of the passageway of the thermal receiver; and wherein the photovoltaic receiver is configured to allow concentrated solar light passing through the photovoltaic receiver to illuminate the plurality of heat absorbing bodies.

2. The solar receiver of claim 1, wherein the plurality of heat absorbing bodies are a plurality of fins oriented radially along the passageway.

3. The solar receiver of claim 1, wherein the passageway has a cylindrical geometry.

4. The solar receiver of claim 1, wherein the passageway has a conical geometry.

5. The solar receiver of claim 1, wherein the passageway has an opening conforming to the size of the second opening of the housing.

6. The solar receiver of claim 1, wherein the plurality of heat absorbing bodies include one or more internal channels.

* * * * *